(12) United States Patent
Krybus et al.

(10) Patent No.: US 11,051,917 B2
(45) Date of Patent: Jul. 6, 2021

(54) PROSTHESIS AS WELL AS RETROFIT KIT FOR A PROSTHESIS

(71) Applicant: Ivoclar Vivadent AG, Schaan (LI)

(72) Inventors: Robert Wolfgang Krybus, Oberschan (CH); Andreas Häfele Clemens, Weiler (AT); Konrad Hagenbuch, Haag (CH); Roger Frei, Heerbrugg (CH)

(73) Assignee: Ivoclar Vivadent AG, Schaan (LI)

( * ) Notice: Subject to any disclaimer, the term of this patent is extended or adjusted under 35 U.S.C. 154(b) by 70 days.

(21) Appl. No.: 16/524,520

(22) Filed: Jul. 29, 2019

(65) Prior Publication Data

US 2020/0038151 A1 Feb. 6, 2020

(30) Foreign Application Priority Data

Aug. 3, 2018 (EP) .................................... 18187282

(51) Int. Cl.
*A61C 13/01* (2006.01)
*A61C 13/25* (2006.01)

(52) U.S. Cl.
CPC .................................... *A61C 13/01* (2013.01)

(58) Field of Classification Search
CPC ....... A61C 13/24; A61C 13/245; A61C 13/25; A61C 19/063; A61C 7/08; A61C 13/01; A61C 13/0001; A63B 71/085
USPC ..... 433/199.1, 171, 172, 177–179, 184–188; D24/156, 176
See application file for complete search history.

(56) References Cited

U.S. PATENT DOCUMENTS

| 1,337,622 | A | | 4/1920 | Reese | |
|---|---|---|---|---|---|
| 1,337,662 | A | * | 4/1920 | La Porte | B23K 37/053 219/147 |
| 1,510,538 | A | * | 10/1924 | Berthold | A61C 13/25 433/185 |
| 1,972,596 | A | * | 9/1934 | Linchitz | A61C 13/245 433/185 |
| 2,029,945 | A | * | 2/1936 | Rubinstein | A61C 13/245 433/185 |
| 2,115,939 | A | * | 5/1938 | Brown | A61C 13/245 433/187 |
| 2,897,594 | A | * | 8/1959 | Kopec | A61C 13/245 433/185 |
| 3,409,985 | A | * | 11/1968 | Graceffo | A61C 13/245 433/185 |
| 3,644,997 | A | * | 2/1972 | Fernandez | A61C 13/24 433/184 |
| 3,745,652 | A | * | 7/1973 | Aiderman | A61C 13/24 433/184 |

(Continued)

FOREIGN PATENT DOCUMENTS

| DE | 599592 | * 10/1933 | .......... A61C 13/245 |
|---|---|---|---|
| DE | 1201948 | * 9/1965 | .......... A61C 13/245 |

(Continued)

*Primary Examiner* — Cris L. Rodriguez
*Assistant Examiner* — Sharon E Kennedy
(74) *Attorney, Agent, or Firm* — Ann M. Knab; Thad McMurray

(57) ABSTRACT

The invention relates to a dental prosthesis comprising a prosthesis base and teeth which are attached in or to the prosthesis base (14), wherein the prosthesis base (14) comprises a ventilation element, in particular a ventilation valve (12).

15 Claims, 3 Drawing Sheets

(56) References Cited

U.S. PATENT DOCUMENTS

| | | | | |
|---|---|---|---|---|
| 4,583,949 A | * | 4/1986 | Heartness | A61C 13/25 |
| | | | | 433/185 |
| 5,634,792 A | * | 6/1997 | Brisendine | A61C 13/0024 |
| | | | | 433/142 |
| 2004/0137405 A1 | * | 7/2004 | Fang | A61C 13/0001 |
| | | | | 433/167 |

FOREIGN PATENT DOCUMENTS

| | | | | | |
|---|---|---|---|---|---|
| DE | 1541203 | | * | 9/1969 | A61C 13/245 |
| GB | 396290 | | * | 8/1933 | |
| GB | 396290 | A | | 8/1933 | |
| GB | 415671 | | * | 8/1934 | A61C 13/245 |

\* cited by examiner

PROSTHESIS AS WELL AS RETROFIT KIT FOR A PROSTHESIS

CROSS-REFERENCE TO RELATED APPLICATIONS

This application claims priority to European patent application No. 18187282.1 filed on Aug. 3, 2018, the disclosure of which is incorporated herein by reference in its entirety.

TECHNICAL FIELD

The invention relates to a dental prosthesis and to a retrofit kit for a dental prosthesis.

BACKGROUND

It has been known for long that dental prostheses are to fit the alveolar ridges and the palate as accurately as possible to realize proper wearing comfort.

An older solution has become known from U.S. Pat. No. 2,029,945, which is hereby incorporated by reference. In case of this prosthesis, a valve is configured on the side of the alveolar ridge which is to support the suction effect of the prosthesis at the alveolar ridge to enable better adhesion of the prosthesis.

Recently, it has become possible to further improve the accuracy of the fit by digital technology. Then, the prosthesis is considered less unpleasant—especially as an upper jaw prosthesis with a comparatively large support surface. Additionally, it attaches itself better to the support surface by suction such that it does not come off accidentally.

This holds true particularly for full prostheses.

However, the increased suction means that it is more difficult to detach the prosthesis.

It has already been suggested to configure a gap towards the support surface at the edge of the prosthesis such that the patient may engage the finger and loosen the prosthesis more easily. However, therefore, leftovers collect in the gap unfortunately which is unhygienic on the one hand and affects the adhesion of the prosthesis altogether on the other hand.

SUMMARY

Thus, the invention is based on the task of providing a dental prosthesis as well as a retrofit kit for a dental prosthesis which is improved with respect to handling and efficiency without affecting the wearing comfort.

According to the invention, it is provided that the prosthesis base is provided with a ventilation element. Here, ventilation is considered the supply of air to the side of the prosthesis facing away from the teeth.

Preferably, the ventilation element is arranged centrally in the prosthesis base. Even if the diameter of the ventilation element amounts to only 5 mm or less than 1 cm for instance, ventilation of this region is sufficient to negate the suction effect of the prosthesis and to detach the prosthesis easily.

An upper jaw prosthesis may comprise a ventilation element for instance at the highest position. The ventilation element ensures that air reaches the palate at one position when it is actuated. From there, the air also reaches surrounding regions of the palate such that the negative pressure present thereat is released.

According to the invention, it is favorable if the ventilation element is configured as a valve, that is to say as a ventilation valve. Then, actuation may be effected manually or automatically. It is possible, for instance, to configure the valve such that pressure onto a valve body of the valve, as may be applied by a finger, for instance, shifts the valve body such that the valve opens.

The valve body closes the valve opening as soon as the pressure is removed.

However, other configurations of the ventilation element are also possible. In this respect, a ventilation opening may be closable without further ado by means of a plug, a slide or a flap. These elements may be removed manually to enable ventilation of the prosthesis.

Magnetic actuation of the valve body is provided in a further configuration. It comprises ferromagnetic material for this purpose. The valve body may be moved by means of a small magnetic pen or any desired permanent magnet and thus the valve is opened.

The inventive ventilation valve may also be prefabricated and inserted into a mold before the prosthesis base is produced such that it is overmolded during the injection molding process.

In case of material-removing processes for producing the prosthesis base, for instance in case of milling, the ventilation valve may also be realized in the blank already. Alternatively, it is also possible to mill the valve opening and to insert the valve body afterwards.

According to the invention, insertion of the valve body is possible preferably from the palatal side, that is to say from the side facing away from the teeth. When the prosthesis is inserted, the valve body cannot be removed and is thus held such that it may not be swallowed.

In a further preferred embodiment, the valve is configured as an automatic valve with hysteresis. The valve opens at an opening pressure and closes at a closing pressure, wherein the closing pressure is lower than the opening pressure. This solution enables automatic suction attachment of the prosthesis, in particular of the upper jaw prosthesis. The opening pressure may be predefined in an amount between 50 mbar and 300 mbar.

In a further configuration, the ventilation element is configured as a pump which may pump air in the desired direction.

In a further advantageous configuration, the valve is configured as an electromagnetic valve wherein control by the patient is possible by means of any desired actuation element.

Preferably, the ventilation valve is a check valve which is openable such that venting is possible during insertion of the prosthesis at the same time.

It is preferred that the ventilation element extends substantially flush with the tooth side of the prosthesis. In this way, tongue irritations may be avoided largely.

As the valve body may be removed toward the palatal side, it is also easy to clean, as is the valve opening after removal of the valve body.

BRIEF DESCRIPTION OF THE DRAWINGS

Further advantages, details and features may be taken from the following description of several exemplary embodiments of the invention in conjunction with the drawings.

DETAILED DESCRIPTION

Figure 1:
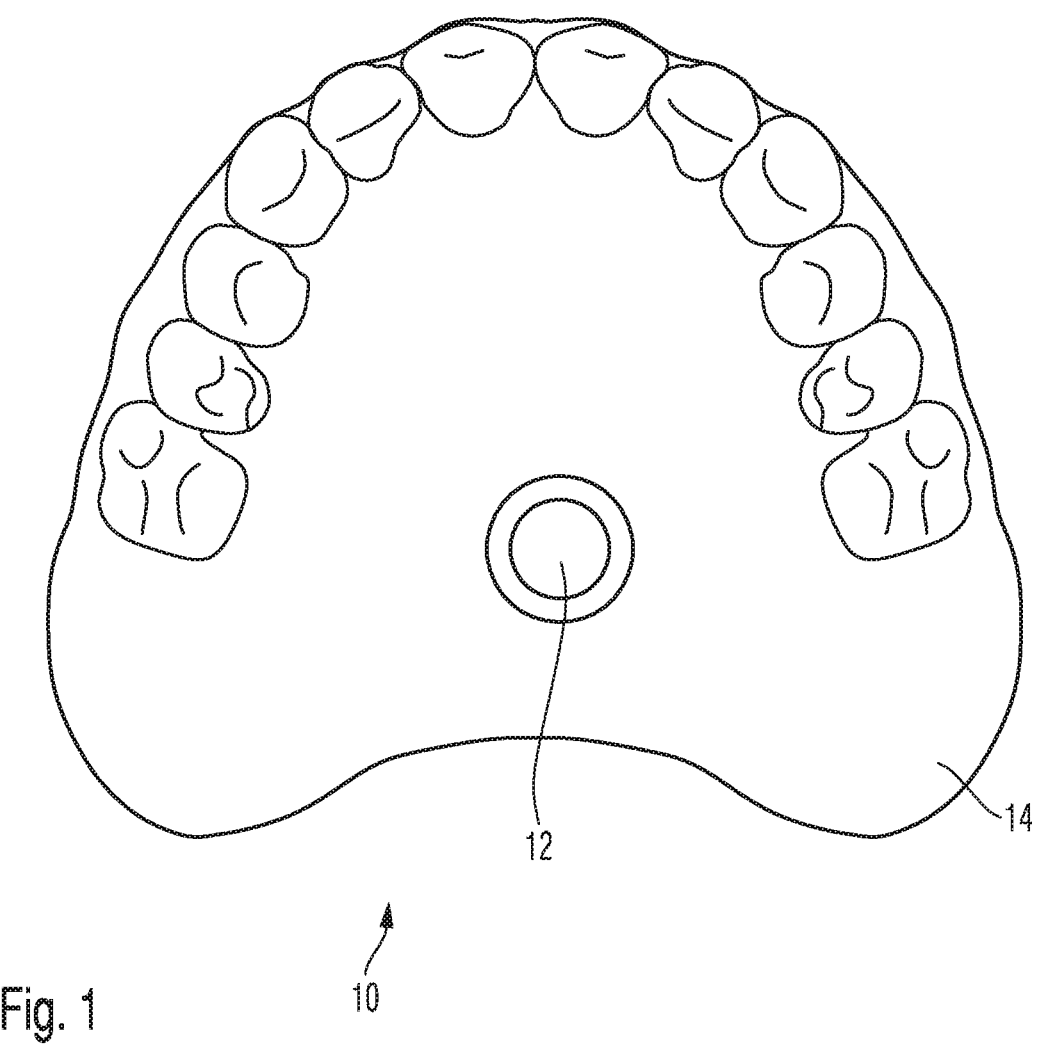
FIG. 1 shows a top view of an inventive dental prosthesis from the tooth side, in a first embodiment.

A dental prosthesis 10 is illustrated in FIG. 1, an upper jaw prosthesis in the exemplary case. The prosthesis base 14 comprises centrally a ventilation valve 12 as a ventilation element.

The ventilation valve 12 comprises a valve body 16 which is guided movably in or at a valve opening. In one position, the valve body abuts against the valve opening such that the valve 12 is closed. In the other position, there is a gap between the valve body 16 and the valve opening such that air may flow through the valve 12.

In a preferred configuration, the closed position is spring-loaded such that the valve 12 closes automatically and is opened when actuated by the patient.

Opening causes that air may stream from the interior of the mouth towards the top, that is to say towards the palate of the patient, and that the negative pressure present thereat is released.

Figure 2:
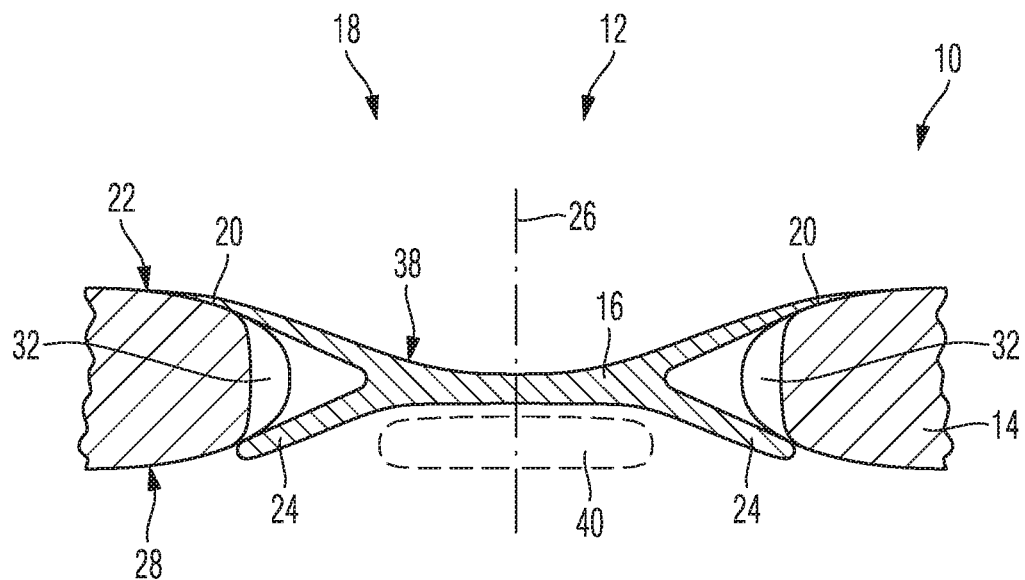
FIG. 2 shows a section through a ventilation valve in a further embodiment of the inventive prosthesis.

A possible configuration of a ventilation valve 12 is illustrated in FIG. 2.

FIG. 2 shows a part of an inventive dental prosthesis 10 comprising the ventilation valve 12.

The ventilation valve 12 is installed in a prosthesis base 14. It comprises an elastic valve body 16 which covers a valve opening 18. Valve 12 may be installed with adhesive bonding or polymerization.

For this purpose, the valve body 16 comprises a circumferential valve body lip 20 which rests on a tooth side 22 of the prosthesis base circularly around the valve opening 18 and seals against it in the manner of a suction cup lip.

Thus, the valve 12 forms a one-way valve or check valve at the valve body lip 20, said valve opening upon positive pressure on a side 28 of the prosthesis base facing away from the teeth compared to the pressure on the tooth side 22, and releasing this pressure and blocking thereat in case of negative pressure.

The valve body 16 further comprises a counter holding flange 24 which also extends circularly but is spaced apart when viewed from the valve body lip 20 in the direction parallel to a valve axis 26 and also abuts against the periphery of the valve opening 18 on the side 28 of the prosthesis base 14 facing away from the teeth.

The combination of counter holding flange 24 and valve body lip 20 holds the valve body 16 undetachably at the valve opening.

Figure 3:
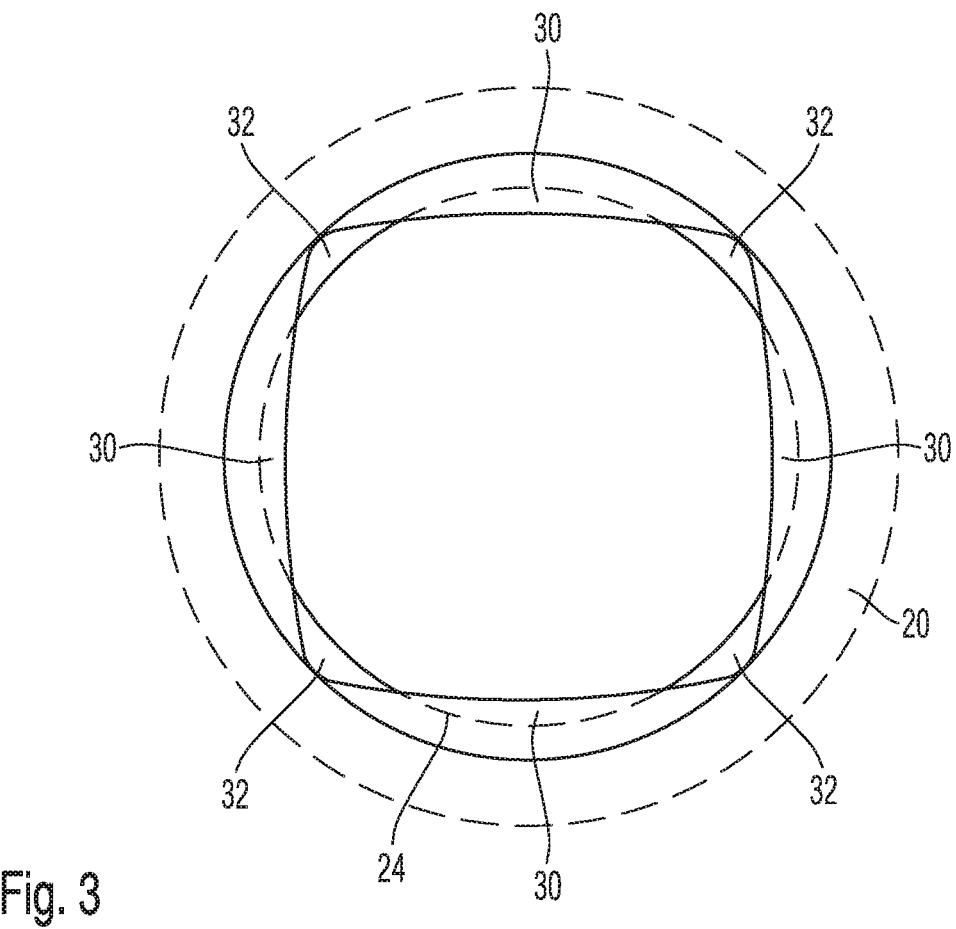
FIG. 3 shows a top view of the ventilation valve according to FIG. 2.

The valve opening 18 is configured with a special design. It comprises—as is apparent from FIG. 3—radially protruding regions 30 and radially outwardly receding regions 32. They alternate when viewed in the circumferential direction of the valve opening 18.

In the exemplary case, four alternating receding regions 32 and protruding regions 30 are provided each, wherein it is to be understood that any desired other number of corresponding regions, for instance 8 or 10, may be configured, wherein the edge of the valve opening may also be configured undulatory when viewed in the top view.

The ventilation valve 12 may be opened manually upon central pressure on an actuation element 38 at its upper side. The valve body 16 is deformed in such a way that the valve body lip 20 at the regions 30 is supported more strongly radially towards the inside and is thus lifted accordingly radially on the outside. This lifting motion opens the radially outward regions 32 (see FIG. 3) and air may stream from the tooth side 22 to the side 28 facing away from the teeth such that the prosthesis is vented and may be removed easily.

The valve body 16 is configured to consist of an elastic material, more elastic than the prosthesis base 14 in any case and such that it abuts between the counter holding flange 24 and the valve body lip 20 in the idle state because of pretension.

The inventive ventilation valve 12 additionally comprises a bleed function in the embodiment illustrated herein. When the prosthesis is pressed to the palate on the side referred to as the side 28 facing away from the teeth herein, positive pressure is produced on the side 28 of the prosthesis base 14 facing away from the teeth in the region of the air cushion 40 compared to the tooth side 22. This positive pressure may be released easily via the valve body lip 20 as the bottom side of the valve body lip is in fluid connection with the side 28 of the prosthesis base facing away from the teeth due to the radially receding regions 32.

In case of a corresponding swallowing movement of the patient, negative pressure is generated on the tooth side 22 which leads to bleeding of air from the region of the air cushion 40 via the valve 12 acting as the bleed valve.

As the precisely produced prosthesis is pressed on, it adheres to the palate of the patient especially well, but it may be opened and thus removed upon pressure on the actuation element 38 at the central region on the upper side of the valve body 16.

Figure 4:
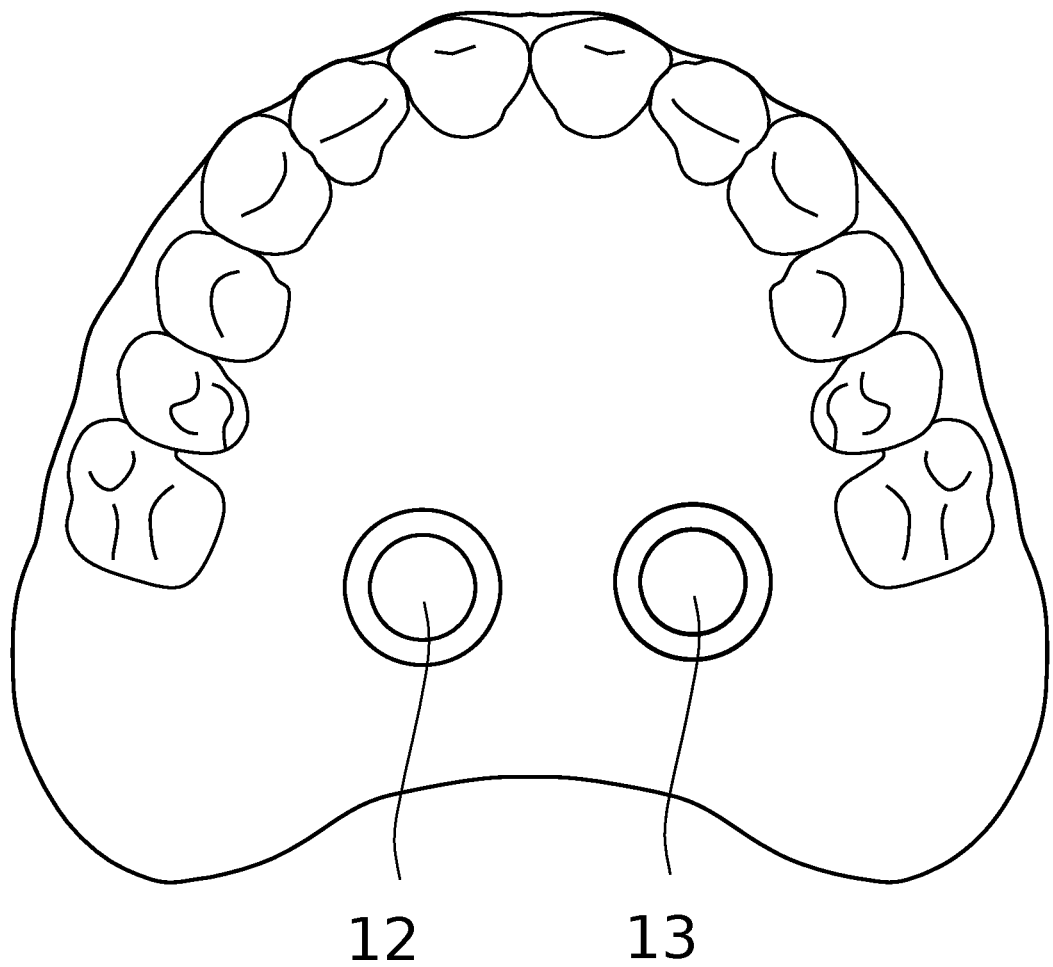
FIG. 4 shows a top view of an inventive dental prosthesis from the tooth side showing two ventilation valves.

FIG. 4 shows a prosthesis base having two ventilation valves 12, 13 spaced apart from one another.

The invention claimed is:

1. A dental prosthesis comprising
a prosthesis base, and
teeth which are attached to the prosthesis base,
wherein the prosthesis base comprises a ventilation element,
wherein the ventilation element comprises a ventilation valve,
wherein the ventilation valve is combined with a bleed valve,
wherein both the ventilation valve and the bleed valve close automatically under pretension and only the ventilation valve may be opened by manual actuation, and
wherein a valve body of the ventilation valve and the bleed valve ends in a valve body lip which extends on a tooth side of the prosthesis base and covers and closes the valve opening in the manner of a suction cup lip.

2. The dental prosthesis as claimed in claim 1, further comprising
an actuation element for manual actuation of the ventilation element, and
wherein the ventilation element extends between a tooth side and a side of the prosthesis base facing away from the teeth.

3. The dental prosthesis as claimed in claim 2,
wherein pressure on the actuation element of the ventilation element configured as a ventilation valve opens the ventilation valve.

4. The dental prosthesis as claimed in claim 1,
wherein the ventilation valve is closed in an idle state under pretension and openable against the pretension.

5. The dental prosthesis as claimed in claim 1,
wherein the ventilation valve is configured centrally at an upper jaw prosthesis and extends between a palatal side and a tooth side of the prosthesis.

6. The dental prosthesis as claimed in claim 1,
wherein the ventilation valve extends between an alveolar ridge side of the prosthesis and a tooth side of the prosthesis, and
wherein at least two ventilation valves are configured spaced apart from one another.

7. The dental prosthesis as claimed in claim 1,
wherein the ventilation valve is configured as a check valve, via which an air cushion may be vented on a side of the prosthesis base facing away from the teeth.

8. The dental prosthesis as claimed in claim 1,
wherein a valve body of the ventilation valve is mounted movably with respect to the prosthesis base and is part of both the ventilation valve and a bleed valve.

9. The dental prosthesis as claimed in claim 1,
wherein the ventilation valve comprises a valve body which is held undetachably in a valve opening which is configured as a through-opening in the prosthesis base.

10. The dental prosthesis as claimed in claim 9,
wherein the valve body of the ventilation valve extends beyond the valve opening in the prosthesis base both on a tooth side of the prosthesis base and on the side of the prosthesis base facing away from the teeth and bears against it in the idle state.

11. The dental prosthesis as claimed in claim 8,
wherein the valve body deforms upon application of pressure to an actuation element of the valve body from a tooth side of the prosthesis base.

12. The dental prosthesis as claimed in 1,
wherein the valve body lip is lifted from the prosthesis base upon application of pressure to an actuation element of the valve body from the tooth side of the prosthesis base and opens the valve.

13. The dental prosthesis as claimed in claim 1,
wherein the combined ventilation and bleed valve abuts against the prosthesis base with a predefined pretension of the valve body and with a valve body lip which corresponds to a predefined opening pressure at which the valve is opened, said opening pressure amounting to between 50 mbar and 300 mbar.

14. A retrofit kit for a dental prosthesis comprising
a prosthesis base having a valve body which is configured to be inserted into a valve opening to be installed in the prosthesis base, and is attachable thereat by adhesive bonding or polymerization, and
wherein the valve body is a ventilation valve combined with a bleed valve,
wherein both the ventilation valve and the bleed valve close automatically under pretension and only the ventilation valve may be opened by manual actuation, and
wherein the valve body of the ventilation valve and of the bleed valve ends in a valve body lip which extends on a tooth side of the prosthesis base and covers and closes the valve opening in the manner of a suction cup lip.

15. A retrofit kit for a dental prosthesis comprising
a prosthesis base having a combination of a valve body with a valve seat which are prefabricated such that they match one another,
wherein the valve seat is configured for installation in a bore configured for installation in the prosthesis base and is attachable thereat by adhesive bonding or polymerization and
wherein the valve body is a ventilation valve combined with a bleed valve,
wherein both the ventilation valve and the bleed valve close automatically under pretension and only the ventilation valve may be opened by manual actuation, and
wherein the valve body of the ventilation valve and of the bleed valve ends in a valve body lip which extends on a tooth side of the prosthesis base and covers and closes the valve opening in the manner of a suction cup lip.

\* \* \* \* \*